United States Patent
DeVries

(10) Patent No.: US 9,965,819 B1
(45) Date of Patent: May 8, 2018

(54) REAL-TIME SCHOOL BUS AND STUDENT TRACKING

(71) Applicant: John DeVries, Palm Desert, CA (US)

(72) Inventor: John DeVries, Palm Desert, CA (US)

(*) Notice: Subject to any disclaimer, the term of this patent is extended or adjusted under 35 U.S.C. 154(b) by 0 days. days.

(21) Appl. No.: 15/360,805

(22) Filed: Nov. 23, 2016

Related U.S. Application Data

(60) Provisional application No. 62/260,180, filed on Nov. 25, 2015.

(51) Int. Cl.
  *G06Q 10/00* (2012.01)
  *G06Q 10/08* (2012.01)
  (Continued)

(52) U.S. Cl.
  CPC ....... *G06Q 50/265* (2013.01); *G06K 9/00604* (2013.01); *G06K 9/00617* (2013.01);
  (Continued)

(58) Field of Classification Search
  CPC ...... G06Q 10/00; G06Q 10/08; G06Q 10/087; G06Q 10/06
  (Continued)

(56) References Cited

U.S. PATENT DOCUMENTS 8,317,325 B2  11/2012  Raguin et al.
8,600,196 B2  12/2013  King et al.
(Continued)

FOREIGN PATENT DOCUMENTS

WO    WO0030525    6/2000

OTHER PUBLICATIONS

Business Wire | "Fujitsu and T&W Operations, Inc., Collaborate to Develop Kidtrack System Using the PalmEntry Physical Access Control System" webpage as provided by Internet Archive Wayback Machine at <https://web.archive.org/web/20130325073610/http://www.businesswire.com:80/news/home/20130318006411/en/Fujitsu-TW-Operations-Collaborate-Develop-Kidtrack%E2%84%A2-System>, published on or before Mar. 25, 2013.
(Continued)

*Primary Examiner* — Daniel Hess
(74) *Attorney, Agent, or Firm* — Hanrahan Law Firm, P.A.; Benjamin M. Hanrahan

(57) ABSTRACT

School District Administrators have the real-time monitoring of students and school buses during daily school transportation. The IRITRANS® system will provide school districts with real-time bus locations and more importantly the "specific identity of all students on-board". The system prevents students from becoming lost by boarding or exiting at the wrong assigned bus stop. The iris scanning process is completely mobile from all points of the bus for loading and unloading students with special needs requirements. If a student has a medical emergency the medical history is available to responders for correct treatment. In a hijacking event authorities have access to the real-time GPS location of the bus and the specific identity of students onboard. In the event of a school evacuation, administrators know where the students have been taken and the identity of the students on a specific bus to provide parents. On field trips students are accounted for and not left behind on the return trip. Students will not be abandoned or left sleeping on the school bus.

11 Claims, 1 Drawing Sheet

(51) Int. Cl.
*G06Q 10/06* (2012.01)
*G06Q 50/26* (2012.01)
*G08G 1/127* (2006.01)
*H04W 4/02* (2018.01)
*G06K 9/00* (2006.01)
*G06Q 50/20* (2012.01)

(52) U.S. Cl.
CPC ............ *G08G 1/127* (2013.01); *H04W 4/021* (2013.01); *G06Q 50/20* (2013.01)

(58) Field of Classification Search
USPC .......................... 235/385; 340/989; 382/117
See application file for complete search history.

(56) References Cited

U.S. PATENT DOCUMENTS

| | | | |
|---|---|---|---|
| 8,630,464 B2 | 1/2014 | Whillock et al. | |
| 9,202,443 B2 | 12/2015 | Perez et al. | |
| 9,576,491 B1* | 2/2017 | Wu | ........................ G08G 1/127 |
| 2006/0208862 A1* | 9/2006 | Lahr | ........................ B60Q 9/00 |
| | | | 340/433 |
| 2010/0278394 A1 | 11/2010 | Raguin et al. | |
| 2011/0075893 A1 | 3/2011 | Connel, II et al. | |
| 2011/0130153 A1* | 6/2011 | Davis | ..................... G06Q 90/00 |
| | | | 455/456.1 |
| 2014/0125502 A1* | 5/2014 | Wittkop | ................. G08G 1/127 |
| | | | 340/989 |

OTHER PUBLICATIONS

Gizmag | "Kidtrack Biometric System Keeps Track of Kids on School Buses" webpage as provided by Internet Archive Wayback Machine at <https://web.archive.org/web/20130727013400/http://www.gizmag.com/kidtrack-biometric-school-bus-scanner/26723/>, published on or before Jul. 27, 2013.
Kidtrack | "About Kidtrack" webpage as provided by Internet Archive Wayback Machine at <https://web.archive.org/web/20130324224946/http:/www.kidtrackbiometrics.com:80/about>, published on or before Mar. 24, 2013.
Kidtrack | "Do You Know Who Is on the Bus, Right Now?" webpage as provided by Internet Archive Wayback Machine at <https://web.archive.org/web/20130323075446/http:/www.kidtrackbiometrics.com:80/>, published on or before Mar. 23, 2013.
Fujitsu and T&W Operations Inc. Brochure | "How School Bus Attendance can be tracked in Real-Time", obtained on or about Apr. 3, 2013.

\* cited by examiner

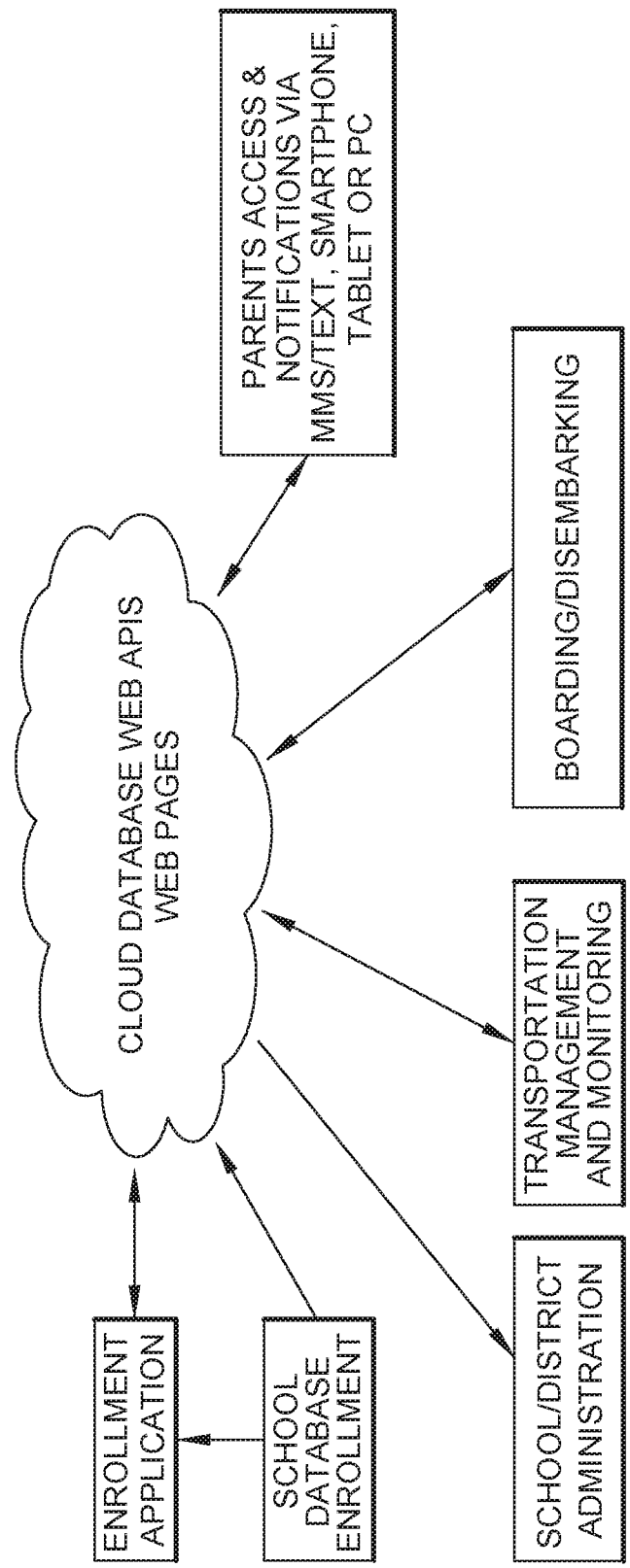

REAL-TIME SCHOOL BUS AND STUDENT TRACKING

This Patent Application Claims Priority on Provisional Application Ser. No. 62/260,180 filed on Nov. 25, 2015 and incorporates the full disclosure of said Provisional Application by this reference.

FIELD OF INVENTION

The present invention relates to a method of identifying students boarding and disembarking from a school bus and the real-time tracking of the school bus and the specific identity of students onboard the bus to and from school during school transportation.

BACKGROUND OF THE INVENTION

Student transportation involves a lot of moving parts and can be a source of a district's greatest risk exposure. Each year there are numerous reports of students getting on the wrong bus, getting off at the wrong bus stop, failing to return home from field trips or even worse, not getting off the bus at all—in some cases with fatal consequences. In addition modern terrorism has no limits and can strike anywhere, at any time and claim any victim. Knowing the location of a student and the specific bus transporting the student and the locations where the student boarded and disembarked from the school bus is tremendously useful for the security of the students and the peace of mind of the parents and the school administration both at the school level and the school district level. This information is enormously helpful to law enforcement when a bus has been attacked, high jacked or a student is believed kidnapped or missing.

It would be tremendously valuable to have access to the real-time location of any school bus in a school district bus fleet and also the real-time specific identify of all students riding each school bus. Besides providing a high level of security, such access monitoring prevents or minimizes the chance of students becoming lost by boarding or exiting a school bus at the wrong assigned stop location.

The identity of the students boarding or exiting the bus is confirmed and recorded by bio-metrically iris scanning the student. In the preferred embodiment the scanning process would be completely mobile so that the students boarding or exiting the bus can be biometrically iris scanned upon entrance or anywhere around the bus. Scan identification processing can be conducted even outside the bus at the back, side or front door entries. A mobile scanning capability provides the ability to identify and process special needs students who have exceptional transportation requirements, such as students confined to a wheelchair.

Knowing what bus a student is being transported on and the location of the bus real-time, is particularly advantageous in the event of a student with a medical emergency or a bus accident. Medical information of a student with special medical problems is maintained in the student data file maintained at the school and/or the school district network server. If a medical emergency arises for a student on a bus during school bus transportation, the bus driver can alert the dispatcher or other administrators at the school transportation department.(collectively referred to as the "school transportation department") of the medical emergency identifying the student by name or by a student identification number. The dispatcher or other equivalent personnel can notify the appropriate medical responder of the medical emergency, identify the student involved and supply the accurate location of the bus. When the time is appropriate, the dispatcher or other equivalent personnel can transmit the medical information in the student's file verbally or by text or email message to a smart phone or computer tablet so the medical responder can treat the student with accurate medical treatment.

School buses have been hijacked in the past and government terror officials list school buses as targets. With the present system and method the bus driver can simply activate an alarm from the computer tablet used in the present invention. Activation of the alarm immediately sends an emergency notification to the transportation dispatcher or other equivalent personnel. The dispatcher or equivalent personnel notifies law enforcement and identifies the bus and gives the real-time location of the bus and optionally the specific students on board the bus.

The present system and method can be used for transportation to and from school and any other student transportation including field trips. For field trips each student will be assigned a specific bus and each student will be scanned to identify when the student boards the bus. When the student disembarks at the field trip destination, the student will be scanned again. At the completion of the field trip, the students will return to their assigned bus and be scanned for identification at boarding. If a student fails to board the assigned bus for the return trip at the completion of loading the bus, the scanning system will sound and/or visually signal that a student is missing. The driver will take appropriate action as established by the school or school district administration policy. If all the students have boarded their assigned bus, they will make the return trip. When the bus returns to the drop off point, students will be scanned again for identification assuring all students have returned and exited the bus. In this process all students can be accounted for that made the field trip.

A reoccurring problem with school bus transportation is substitute drivers not being familiar with an assigned daily route. Over time the substitute drivers learn the school bus routes, but before they master the routes, they must rely on hardcopy maps or typed instructions furnished by the school district transportation department. The computer tablet with an embedded GPS system can display or both audibly or visually provide navigation for the designated bus route to guide or assist the substitute driver.

It is vital for security and other reasons described above to furnish a method and system that can enable school district transportation administrators to have real-time information for the location of each of its school buses and the identity of all students on the bus real-time during all types of daily school transportation.

At the present time most school districts rely on the bus driver to identify the students boarding the bus by visual recognition and/or by name recognition. The bus driver may or may not have a check off list of the names of all the students scheduled for his bus for the bus route. It is a fully manual system and there is no accurate way for the school transportation or district administration to determine real-time what students are on-board the bus or what students have disembarked from the bus. Although some school districts have the bus driver report into the appropriate school district department by radio or cell phone when a student is absent from assigned bus transportation. There is no current system that presently exists, except the system of the present invention that accurately identifies each student that has boarded a school bus or disembarked from a school bus.

Some school districts have initiated an ID card system where the card can be read by an proximity reader mounted on the interior of the bus. This was an improvement over the manual system discussed above. However the system and method are far from accurate. Students can forget or lose or have stolen the ID card/badge or the students can substitute or swap card/badges among themselves. In contrast the present system eliminates the need for ID cards or badges and there is no way that a student can lose or substitute an iris identification. The iris bio-metric identification is a fool proof way to identify a student because each person's iris is unique to that person. No two people have the same distinctive iris patterns, even identical twins. The left and right iris of the same person are also different patterns. The present system and method is one of the most accurate biometric processes available for identification purposes. It is mobile and can be used anywhere inside or outside the bus, It is accurate and with a good reading always correctly identifies the student assuming that the student has been previously enrolled in the database and his scanned enrollment reading is stored in a school district's Cloud database server.

All other solutions being used are found to be inaccurate, inconsistent, non-secure products using ID identification cards, RFID tags or bar code components to track students. These components can easily be lost, forgotten, misplace or traded. The iris bio-metric solution is the one and only 99.5% accurate and most ideal system available for school transportation requirements. The system and method of the present invention completely separates itself from any other solution on the market with its mobility, accuracy and identification consistency.

SUMMARY OF THE INVENTION

The system and method of the present invention provides school districts with knowledge for school real-time bus GPS locations and the real-time specific identity of all students on board the school bus. The information can conveniently be displayed on a school district website. The system and method of the present invention will be branded as the IRITRANS School Bus Tracking and Student Safety and Security System and the IRITRANS School Bus and Student Security Method. Each student is iris scanned with a handheld portable bio-metric iris scanner when boarding or exiting the bus comparing and matching iris templates ("templates" herein) stored on the computer tablet identifying individual students. The scan matching takes only two to three seconds per student and provides the school district administration with tracking history for each child and if the school district administration chooses, the system can also provide parents with notifications via text message when their child boards or exits the school bus.

The product of the present invention is comprised of the following components: (1) An android computer tablet is carried on each school bus. The computing platform is an Android operating system. The Android computer tablet has the required operating and memory parameters to support the extensive iris biometric matching process used in the present system and method. The entire school district student database is preferably enrolled and maintained in a school district cloud database and is updated frequestly. A iris biometric scanner is attached by a USB connection to a computer tablet, preferably an Android computer tablet, to collect student matching template as the student boards and disembark the bus at assigned stops. An embedded cellular wireless network sends both students matching data and bus GPS coordinates at incremental times to the school district's Cloud network database management system, i.e., a Cloud database management system that is hosted by a service provider on a remote server and accessed over the Internet.

A computer tablet, preferably an Android computer tablet, is carried on each school bus and is in the possession of the bus driver. The computing platform of choice is an Android operating system. The Android computer tablet has the required operating and memory parameters to support the iris biometric matching process. The entire school district student database is contained in the Microsoft Cloud database and is updated frequently. A USB or Bluetooth connected iris biometric scanner is attached to the Android computer tablet to compare student matching templates as the student boards and disembarks the bus at assigned stops. An embedded cellular wireless network sends both student and GPS coordinates at incremental times to the secure school district Cloud database management system.

The necessary system components are the Android computer tablet or smartphone, iris Biometrics scanner, Global Position Satellite and a wireless cellular data network. An Android smart phone could be used in place of the computer tablet but at the present time a smart phone does have the versatility, functionality and capabilities of the computer tablet. The solution of the present invention focuses on the real-time location of a specific school bus and the real-time accurate identification of specific students on the bus or the specific students that have disembarked from the bus, if any. The primary student tracking component is the use of iris bio-metrics for this application.

When a school bus departs from the transportation yard the driver will sign in with a user name and password. The driver then selects the specific route computer tablet screen. The driver then authenticates on the screen confirmation of both the bus and route. The system will automatically go into a standby scanning mode when the bus starts each route and will automatically go to a scanning mode when with 75 meters of a student stop. The tablet and scanner outside 75 meters will automatically hibernate in between stops to conserve battery life. As students board the bus at school or their assigned stops the bus driver will hold the scanner within 2" to 4" from the student's eyes and an iris template identity comparison is made on the computer tablet, and validates that the identified student is assigned to that stop. At the end of the morning route when the bus reaches the school the system will automatically switch into the unloading students scan mode. The GPS system triggers the application to switch into the student disembarking scanning mode on the tablet when the bus has reached the end of the morning route at school. When all students have exited the bus, the driver will end the current trip by entering an 'end route' command the tablet and if anyone is left on the bus, the driver will get a visual and audible warning from the computer tablet that all students have not exited the bus and to inspect the bus by walking the bus front to the rear. On an afternoon route from the school to home the system scanning works the same by automatically going from loading students at school to unloading students at each students assigned home stops and the driver ends the trip at the last stop. If a scan match is not successful the student is not allowed to board or disembark the bus without driver intervention. The same scanning process is used either boarding or exiting the bus. During the scanning process the GPS application is recording specific bus latitude and longitude continually and with the cellular wireless component the GPS coordinates and the collected student identification data is sent to the Cloud database network server in timed increments. The school district Cloud database manages student and GPS location data providing real-time and history reports for the tracking of students and the buses. Authorized school district administrators have access to a custom desktop mapping website to see where their buses are at all times combined with a number of historic reports showing the students boarding and disembarking history.

This invention will be used in school transportation to give school administrators real-time knowledge of the location of all district school buses and the specific students onboard eliminating potential student emergencies, such as, a student being left sleeping or abandoned on the school bus at the completion of the bus route.

All student data is encrypted and stored in a secure Cloud database under a unique student ID number. There is no student identification information stored on the bus driver's computer tablet that could compromise student identity if the driver's computer tablet has been lost or stolen.

The present invention is directed to School Transportation Safety and Security. After more than a decade of research and development and with the advancement of bio-metric technology, a ground-breaking safety and security solution for the real-time tracking of students and school buses during daily transportation has been invented. The system and method of the present invention will enable school district's to track the real-time location or route of its school buses, and more importantly, to obtain the real-time "specific identity of all students on-board the bus". Thus if the school district administration has a need to locate a student whom they believe is being transported on one of the school buses, administration personnel can locate the bus on a GPS mapping website by clicking on the appropriate school bus assigned to the student to access real-time information to determine when and where the student boarded, exited or is currently on the school bus. Key features and benefits of the present invention include the following:

Real-Time Student Tracking—Real-Time Student Tracking—The iris bio-metric identification system of the present invention provides the unique identity of who is on the school buses at all times or when or where they boarded or exited the bus.

Mobile Scanning Boarding—Disembarking—Mobile or portable scanning of the system and method of the present invention addresses special needs student requirements for boarding and disembarking from all loading points of the bus. The student can be easily and comfortably scanned while in a wheel chair.

Fast and Efficient Boarding and Disembarking Buses—Under the system and method of the present invention each student is scanned with the handheld scanner when they enter and exit the bus. Boarding and exiting bio-metric scanning time is within (1-3) seconds for the required processing speed for maintaining a schedule.

Real-Time Bus Tracking—The GPS system employed in the system and method of the present invention knows real-time where all the school buses are located and visible on the website.

Security for Students Boarding or Exiting at Designated Bus Stop—The system and method of the present invention provides an alert that is visible and audible to notify the bus driver that a student last (just) bio-metrically scanned on or off the bus is or not an authorized student bus rider. The system and method of the present invention records date, time and location as each student boards and exits the bus.

Driver Activated Emergency Alert—In the event of a hijacking, disturbance, accident or any other bus emergency, the system and method of the present invention permits the driver to activate an emergency alarm from the driver's computer tablet that will only be visible at the school district transportation office or any user defined choice such as police.

Sleeping Student Safety Check—The system and method of the present invention provide a student and bus safety check. When the driver ends a bus route the system and method of the present invention alerts the driver if a student that boarded is still on the bus and alerts the bus driver to inspect the bus interior to prevent any student from being left sleeping or abandoned on the bus.

Immediate Student Medical Information—In the event of a student medical emergency during transportation, the specific student's medical information can be sent to the computer tablet or any computing device located on the bus. This provides the medical personnel sent to the scene of the medical emergency the student's medical history on file and prevents medical mistreatment of the student. This is an option provided by the system and method of the present invention. The school district can choose to incorporate the option into their system and procedures. The option can be customized for Para Transit services.

Emergency Evacuation—In the event of a school campus emergency evacuation, the system and method of the present invention can be used to easily track all students boarding and being transported on a school bus. Currently during a school evacuation the police randomly load all students on buses to clear the school of students quickly and transport them to undisclosed locations for safety. With the system and method of the present invention, school administrators will know which students got on which bus and the current location of the bus for parents to retrieve their children.

Real-Time Flexibility—In real-time school transportation administration can adjust the student roster on daily bus routes in the event of overloads, bus breakdowns and other major or minor emergencies.

Field Trip Monitoring—The system and method of the present invention automatically calculates the boarding and disembarking activity during transportation of students on field trips. An audible and visible alarm will notify the driver if any student that rode the bus to the trip destination is not on the bus when the bus is ready to leave the field trip destination for the return to the school starting location.

Secured System Server and Encrypted Student Data—Student data security is critical and the stored student data and information on the bus electronic devices, computer tablet computer or smart phone, is encrypted and secured employing the highest level of security that protects data equal to computers on the school district network. If a device was missing or stolen, there is no student identification information accessible or retrievable from the device. In addition, with the embedded GPS application, district administration can locate the device or notify the police exactly where the device can be retrieved.

Activity History Reporting—With the system and method of the present invention school district administrators have website access to retrieve a series of user defined bus and student activity reports. Including but not limited to any student riding history or bus travel history.

Administration Route Stop Changes—With the system and method of the present invention, school transportation administration is able to add or delete route stops during or prior to daily routes. This functionality is most important in the daily Special Needs student transportation requirements for last minute stop changes.

Real-Time Parent Notification App—The system and method of the present invention has the capability to notify parents via text message when their children boards the bus in the morning at their assigned or home bus stop, and when they exit the bus at school. The parents can also be texted to advise when their child boards the bus at school and exits the bus at their assigned home bus stop after school. This is particularly comforting for the working parents or guardians.

The present invention is directed to a system for tracking the location of a school bus and identifying the students on-board the bus in real-time. The system comprises of: a Cloud database network that stores the enrolled iris biometric iris template of students authorized for school district bus transportation. The Cloud database server receives incrementally the bus GPS locations data and the matching iris biometric data identifying each student boarding or exiting the school bus; a portable iris scanner device for matching a student's iris template to the students enrolled template for correct identification data; a mobile computer tablet school bus driver uses to receive the biometric iris image from portable iris scanning device, the mobile computing tablet receives and stores the biometric iris image template from the cloud data base of the students assigned to the bus route.

In a preferred embodiment, the bus driver's computer tablet has an embedded GPS (Global Positioning System). The GPS system tracks the GPS location movement of the school bus. The GPS location data is collected in the driver's computer tablet and incrementally transferred to the Cloud server.

GPS location data provides the specific location of each bus and location where each iris scanned identified student boarded or exited the bus real-time.

In another embodiment of the invention, the mobile computing device has an arm strap for securing the mobile computing device to the drivers arm so that the bus driver has freedom of movement and mobility to the perform the iris scanning of students boarding and disembarking the bus.

In one embodiment, the student bio-metric identification template from the portable iris scanner is received by the computer tablet through a wired USB connection or wireless Bluetooth connection.

A method of monitoring students during school bus transportation to and from school comprising the steps of: Starting at the commencement of a school bus route, biometrically identifying each student by scanning the iris of each student boarding the bus and comparing the iris scan image with enrolled student iris template for students authorized to use school transportation buses in order to confirm student identification and thus confirming that the iris scanned student is a authorized bus rider; Totaling the number of students that boarded the bus after the last student has boarded the bus on the school bus route; Scanning the iris of each student disembarking the bus and comparing the iris scan template with the enrolled student iris template for students authorized to use the school buses for transportation in order to confirm student identification and thus confirming that the iris scanned student is authorized to ride the school bus; and at the completion of the bus route when all students have disembarked the bus, comparing the total number of students exiting the bus with the total number of students that boarded the bus to confirm that all students who boarded the bus disembarked from the bus by the end of the bus route."

The present invention is directed to a system for tracking students during school bus transportation comprising of (1) During a school bus route at each stop, identifying students by scanning the iris of each student boarding the bus and comparing the scan template with the pre-recorded student enrollment of students authorized to use the school buses and confirming that the identified student is authorized to ride a specific school bus; (2) Totaling the number of students that boarded the bus after the last student has boarded the bus on the school bus route; (3) scanning the iris of each student disembarking the bus and comparing the iris scan image with the pre-recorded student iris template for students authorized to use the school buses for transportation in order to confirm student identification and thus confirming that the iris scanned student is authorized to ride the school bus; and (4) at the completion of the bus route when all students have exited the bus, comparing the total number of students who exited the bus with the total number of students that boarded the bus to confirm that all students who boarded the bus disembarked from the bus at the end of the bus trip.

In the preferred embodiment of the invention, the iris scanning of each student boarding and disembarking the bus are recorded on a mobile computing device, namely a computer tablet, capable of capturing and matching enrolled iris scan templates. A computer tablet is relatively small and light weight and is easy to carry in a hand, case or hung from a sling or attached to a belt on the bus driver.

The entire route of the school bus is tracked from the commencement of the bus route to the completion of the bus route via a GPS system embedded in the drivers computer tablet.

The identification of each student that boarded and disembarked the school bus and the tracked route of the bus from commencement of the bus route to the completion of the bus route are recorded on the computer device and such student identification and tracked route of the bus are incrementally transmitted to a Cloud database to furnish undated student tracking information. The transmitted updated information is conveniently provided in website form to authorized school district administrators.

In one preferred option of the present invention mentioned earlier, notification to parents or guardian by text messaging from the school district Cloud data base when their children are safely on the bus in the morning and exit at school. The same after school when boarding the bus at school and exiting the bus safely at the student's assigned home bus stop.

The present invention addresses student medical emergencies during school bus transportation. If a student suffers a medical emergency during transportation on a school bus, the bus driver contacts the transportation dispatcher identifying the student. The school district transportation department then notifies the authorized emergency responders furnishing the location of the bus with a medical emergency. The school district transportation department transmits the student's personal medical information to the driver verbally or by sending details to the computer tablet so when emergency responders arrive on the scene of the medical emergency they are provided accurate medical information on the afflicted student.

The present invention addresses the school transportation missing student situation, such as when the student falls asleep on the bus and is overlooked or not detected by the driver at the end of the bus route. At the end of the route, the driver ends the bus trip on his computer tablet by tapping the end-route tab and if all students that boarded the bus during the route have not exited, the computer device will alert the driver visually and audibly that all students that had boarded the school bus during the route have not disembarked the bus by the end of the bus trip. This requires the bus driver to walk through recheck the bus for any missing students.

In another embodiment of the present invention, as an school district option a second level of child left of abandoned or sleeping at the end of the school bus route, the driver's mobile computer device signals the driver visually and/or audibly to walk to the rear of the bus and scan a fixed label identifier with his or her mobile computer device, and upon scanning the fixed identifier, the mobile computer device validates and records the driver's final inspection of the bus. Of course as the bus driver proceeds to the rear of the bus and then proceeds back to the front of the bus, the driver will check the seats.

In an additional alternative embodiment, as an additional safeguard at the end of the school bus route, the driver's computer tablet visually and/or audibly alerts the driver to end the current route and if the driver does not end the route or does not scan the fixed identifier mounted at the rear of the bus within a set time, the computer tablet will automatically send an alert to the school district transportation department that the bus driver did not end the route by carrying out the above required procedure including scanning a fixed label at the rear of the bus.

BRIEF DESCRIPTION OF THE DRAWING

FIG. 1 is a block diagram of the system and method of the present invention.

DESCRIPTION OF THE INVENTION

Referring to FIG. 1, An android, or similar, computer tablet is carried by the bus driver on each school bus. An Android computer tablet has the required operating and memory parameters to support the extensive iris biometric matching process for student identification. In one embodiment of the invention, student identification and data management software is maintained on a Microsoft Cloud server in a typical fashion, or other cloud server, such as the Adobe, Apple or Amazon cloud server. A secure cloud server is used for the protection and security of student identification and information data stored on the cloud server. Student identification data, such as the iris biometric iris scan data (referred to as the 'student template' or 'template' herein") and GPS bus location from the GPS system in or on the bus is sent to the cloud server and collected. Conveniently the data is stored and managed with a data management software or program to manage the collected student identification data and GPS bus location data.

Each school bus driver has a portable, i.e., hand held biometric scanner ("Scanner" herein). Each bus driver also has a computer tablet (aka as a mobile computer device), such as an Android computer tablet. Usually the computer tablet will be programmed to be dedicated to the system and method of the invention herein so a bus driver does not have an option to use the computer tablet for other non-school transportation functions or apps. Preferably the computer tablet will not contain any other of the many applications typically found on a consumer tablet so that it is only dedicated to school bus transportation useage. The Scanner is connected to the computer tablet by hard wire, such as a USB cable, or by wireless transmissions, such as Bluetooth or Wi-Fi (a wireless local area network). The computer tablet collects the student matching template, i.e. biometric iris scan, as the student boards and disembarks the school bus at assigned stops. In one option the computer tablet will signal that the student is attempting to board or disembarking at the wrong bus stop. A cellular wireless data network embedded in the computer tablet transmits both student identification data and GPS coordinates at incremental times to the school district cloud server. Such identification and location data can be processed by the school district Cloud data management server. GPS is embedded in the computer tablet as it is in a smartphone. On the school districts website, the Microsoft Bing mapping or other competitive mapping services to overlay the GPS bus locations on the navigation mapping for visual tracking of the school bus as it proceeds on its route real-time. At any given time, the location of the bus can be determined.

The Global Positioning System (GPS) is a satellite-based navigation system made up of a network of 24 satellites placed into orbit by the U.S. Department of Defense. GPS was originally intended for military applications, but in the 1980s, the government made the system available for civilian use. The GPS system is embedded in many computer tablets and smartphones and is used in navigation applications in these devices as well as vehicles and hunter or outdoor tracking devices.

As mentioned supra, In the preferred embodiment of the present invention the mobile computing device is an Android computer tablet that can be carried by the bus driver. In some cases the computer tablet can be carried or worn on the bus driver's arm or anywhere for the bus driver's easy access and to give the bus driver mobility. As mentioned herein the iris scanner is a portable device and is connected to the computer tablet. This gives the bus driver mobility to process students from any point inside the bus or outside of the bus such as near the front entry door, side door or back of the bus. As mentioned earlier, the portable iris scanner connects to the mobile computing device via Bluetooth or micro USB cable to USB ports on each device. Mobility is a key feature of the present invention. It permits flexibility. For example if a school bus is picking up students in inclement weather, the driver might want to board all the waiting students immediately without having them stand in line extending out into the weather. Another situation involves a school campus emergency situation where the authorities want to evacuate the campus immediately, such as under the threat of a terrorist attack, the driver may be instructed to board all student immediately without delay and without scanning the boarding students. In such events, the bus driver can scan all the seated students at the appropriate bus location because the Scanner and computer tablet are mobile or portable.

In some embodiments, the mobile computing device utilizes a wireless data connection to the Cloud server to receive student enrollment templates to the computer tablet where the comparison of the boarding or disembarking student's iris scan is made.

The mobile computing device can send GPS location information to the Cloud server at regular intervals. In one embodiment of the present invention, once the information is uploaded to the Cloud server, parents can access their child's transportation activity with a smartphone or other computing devices with appropriate web access passwords. The parents access is limited to only their child[s] school bus transportation information. Any school district administrator with security clearance can be authenticated to have access to the bus location information and on-board student information. Typically, only school transportation have an interest in the access and information.

The system and method of the present invention may therefore be deployed as a completely mobile student tracking process that addresses both general and special needs student transportation.

Other school bus and student tracking systems and methods for school bus transportation do not have the processing accuracy or mobility provided in this system of the present invention described herein. Nor do these other systems operate as a completely mobile platform, using widespread mobile communication technology (e.g., computer tablet). Instead, most of the existing systems require equipment to be permanently installed in the school bus. The embodiments described in this specification differ from and improve upon currently existing options by providing a highly portable, flexible and accurate solution.

The system of the present invention may be comprised of the elements listed below. This list of possible constituent elements is intended to be exemplary only and it is not intended that this list be use to limit the system of the present invention just to the follow elements: (1) A mobile or portable biometric iris scanner (e.g. for scanning of each student boarding or disembarking from the school bus). (2) GPS device or system to track bus locations in real-time. (3) A mobile computing device (e.g., smart phone, computer tablet, etc.) connected to the mobile or portable biometric iris scanner.

In addition to the element listed immediately above, the system of the present invention may also include: (1) A student list (e.g., the school district provides a list of students and schools). (2) A biometric dual-eye iris scanner (e.g. for initial registration or enrollment of each student). (3) A web server and Cloud database of student iris scan data connectable to the mobile or portable tablet device and the biometric dual-eye iris scanner. (4) A mobile app for secure website access by parents (e.g., smart phone app and/or text message alerts). (5) School district administration software application (e.g., Internet access to online website reports on student transportation history and the school bus location).

The system of the present invention generally works by following a process or method using some or all the system elements described in the above. In some embodiments, the process may include schools or school district personnel scanning a student's iris for enrollment/registration. The school district Cloud server may receive the enrollment scans and store them in a school district secure Cloud database for that specific district only. When a student is boarding or disembarking a school bus, the student's iris is scanned by the bus driver employing the mobile iris scanner as described herein and the iris scan template is matched to the student from the enrolled templates in the stored in the mobile computing device to validate the identity of the student (i.e., if an identity template match is found between the iris scan of the student and a stored student template, validation of the student's identity is approved. If no match is found between the stored templates and the iris scan of a student, a dropdown list of approved students by name reference appears in the screen of the drivers computer tablet. If the student is not listed in the database of the driver's computer tablet, the driver will notify school transportation department and be instructed on how to proceed.

Routing and navigation applications in the driver's computer tablet help the bus driver to navigate the bus route without reading from a hard copy, such as a paper map. In some cases, the routing and navigation application may also reroute an ongoing bus run, trip or navigation.

As stated herein the handheld portable biometric iris scanner is connected to the mobile computing device and allows the bus driver to scan the iris of a student and match the student to the database template. This ensures that student identity can be accurately validated. Real-time location and history reports for all students and bus activity can be website viewed by school personnel or any other authorized persons.

To make the system of the present invention, a person would need the correct set of computing and scanning hardware devices in addition to a mobile computer tablet. A portable iris biometric scanner. The person would also need to develop software to connect the mobile devices to a Cloud or web server that may be associated with a database management system. A mobile computing device is required which can process scanned images and transmit data to the web or Cloud server. Such elements are not available. The present invention is the first system to contemplate the need for such elements.

When boarding or disembarking students on or off of the school bus, the bus driver may hold the iris Scanner close to the student's eyes, such as 2 to 6 inches away from the eyes to perform the biometric iris scan. The Scanner receives a scanned image of the student's iris. The image template scanned by the Scanner is compared to the student iris templates stored on the mobile computing device. The mobile tablet receives the scan image from the iris scanner and compares the image with stored templates determining an student identity match by providing a visual green screen signal on the tablet device. The driver then knows that the student scanned has been identified and is authorized to board or exit the school bus. If validation or an identity match of student templates is not made, the tablet exhibits a visual red screen signal informing the bus driver that validation of the student identity was no match of identifying student templates. Of course other type signals, besides a green and red screen can be used to advise the driver of the validation or non-validation of the scanned student's identity.

The present invention offers a solution to tracking students within the school bus transportation system and focuses on finding the real-time location of a specific school bus and identifying specific students on board the bus in real-time. The iris scanning of all students on a school bus provides an accurate identification of the students on a given school bus in real-time. Thus a given student can be located during transportation of the student to and from school as long as the student has not disembarked from the bus at the time of inquiry. If the student has disembarked, the location and time of exiting the bus is available in the Cloud server database. The student list (1) may be provided by the school district. (2) Biometric iris scans are then used to enroll students into the Cloud database system. (3) The Cloud server receives the iris scan templates of student and the bus GPS coordinates. (4) GPS embedded in the smartphone or computer tablet. (5) Mobile devices consisting of smartphone, computer tablet, etc. and iris scanner are used in the practice of the invention as described herein. (6) Apps for parent smartphone access to their child's bus travel mapping boarding and disembarking activity and an optional text message notifications for student boarding or and/or exiting the bus can also be provided.

To make the invention better would be to implement it into other student accountability functions such as food service, library, attendance, staff attendance, sporting events. Once all district students biometric enrollment templates have been taken and processed into the school district data base, the present identification system can easily be applied to these other school district vertical applications that require student identification.

Under the method of the present invention, when a school bus departs from the transportation yard, the bus driver will sign into his or her computer tablet with a user name and password, This confirms in the data base the identity of the driver on that daily route for a historic record. The bus driver is assigned a school bus route by the school transportation department either on a daily basis, periodically or full school year. Most school bus drivers have a regularly scheduled bus route. The bus driver selects his specific bus and the route for his or her next trip. Naturally this could be done with maps or print outs, but the use of the computer tablet is much more efficient, convenient and accurate for bus route navigation and offers the advantages of the computer tablet which can activity navigate the route. The smartphone, such as an Android phone or an Apple IPhone, could also be used. But the computer tablet screen has far greater functionality and the computer tablet processing capability is not available on smartphones. The use of a computer tablet is ideal for practice of the present invention. After signing in, the bus driver then authenticates confirmation of the both the bus and route. The system of the present invention automatically goes into a student scanning mode when the bus reaches each assigned stop on the assigned route. To conserve battery life, the computer tablet is programmed to automatically hibernate during extended inactivity between stops. The GPS system signals the system when the bus has arrived at a preprogrammed distance from an assigned stop.

From the bus transportation yard, the bus will proceed along the planned school bus route or field trip route to the first stop to pick up the first students. Each student will be identified by the bio-metric iris scan. The student iris scan image is transmitted by hard wire or Bluetooth to the computer tablet for comparing the student scan image to the enrolled student's template identity from the district student enrollment iris templates.

At the end of the morning route from home to the school, the system of the present invention will be reported by the GPS system. The computer tablet, which is in a hibernation mode between bus stops, will then automatically switch into the unloading of students scanning mode. When all the students on the bus have exited the bus after scanning at the end of the morning route at school, the driver will end the current bus route on the computer tablet. If by chance not all the identified students that boarded the bus were not identified disembarking, the computer tablet will visually display and/or audibly sound an alarm to notify the bus driver that not all the students that boarded the bus have disembarked the bus. This will alert the bus driver to make a visual inspection of all bus seats to locate the missing student[s] if still on the bus or confirm that all students had actually disembarked the bus.

One of the preferred embodiments of the present invention is directed to a sophisticated system and method for tracking students real-time during school bus transportation and overall comprises the steps of: (1) The school district administration provides a student list for iris bio-metric enrollment into the school district secured cloud database. (2) Students listed have their irises scanned with an iris scanner and the iris scanner generates a student recognition template for both eyes of each student. (3) The student individual identity template is stored in the school district secure Cloud database. (4) Each enrolled student template is assigned a unique student ID number in the school district secured Cloud database. (5) Route stop information for each bus is stored in the school district secured Cloud database. (6) School bus route stop information for each school bus route, containing a list of student ID numbers and the individual iris templates for each student assigned to that bus route, is sent from the school district secured Cloud database to the bus driver's computer tablet. (7a) The school bus driver scans the iris of each student boarding or disembarking the school bus on each route stop. The bus driver uses a mobile or portable scanner to scan the iris of the students. The scanned iris image is transmitted to the bus driver's computer tablet. (7b) Each student's iris scan template is compared or matched with the students enrollment templates stored in the bus driver's computer tablet. When the student's iris image is matched during the comparison, the computer tablet signals validation of the student identity by a display output and/or audio output that the student has been identified and the student is permitted to board or disembark from the bus. If the student identification is not identified or validated, the driver follows optional transportation policies of the school district with respect to treatment of the student. (7c) The validation of the student identification as well as the bus GPS coordinates and time stamp is transmitted to the school district secure Cloud database for recording and for historic reporting data. (7d) The school bus GPS coordinates and the time of the GPS reading is transmitted to the school district secure Cloud database at predetermined schedules If the location of any school bus is required at any time during a bus route, the school district's transportation department with use of the present invention can access the school district website and it can determine which students, if any, are on the specific school bus real-time. They can also access the history of a present bus or a bus route made earlier in the day, week, month or year. The school district's transportation department can also determine if a specific student is on the bus real-time, when and where the student boarded the bus if he did and if the student is not presently on the bus the time or location where the student disembarked from the bus. Any school district administrator can be given user name and pass code access to the same information on the website.

As an optional step, the parents or guardians of a student can be automatically notified when and where their child[s] boarded or disembarked from a school bus.

In some embodiments of the invention, the system comprises a mobile computing device that is connected to a portable iris scanner. In some embodiments, the system further comprises a Cloud database server that receives-scanned student identities and tracks the GPS location of the school bus in real-time. The present system also comprises a client application that connects to the web server to display real-time a specific student or student's location in transit including boarding and exiting the bus information Many of the embodiment of the present invention has been described herein. It will be apparent to those skilled in the art that the invention is not limited to the embodiments as set forth herein.

The invention claimed is:

1. A method of monitoring students during transportation by a school bus, the method comprising:

starting at the commencement of a school bus run, biometrically identifying each student by scanning the iris of each student boarding the bus and comparing the iris scan reading with enrolled student iris scans for students authorized to use school transportation buses in order to confirm student identification and thus confirming that the iris scanned student is an authorized bus rider;

totaling the number of students that boarded the bus after the last student has boarded the bus on the school bus route;

scanning the iris of each student disembarking the bus and comparing the iris scan template with the enrolled student iris template for students authorized to use the school buses for transportation in order to confirm student identification and thus confirming that the iris scanned student is authorized to ride the school bus;

at the completion of the bus run when all students have disembarked the bus, comparing the total number of students that disembarked the bus with the total number of students that boarded the bus to confirm that all students who boarded the bus disembarked from the bus by the end of the bus route; and at the end of the school bus run, signaling the driver visually and/or audibly via a mobile computing device to walk to the rear of the school bus and photo scan a fixed identifier with the mobile computing device, and upon scanning the fixed identifier, the mobile computer device validates that the driver walked from the front to the rear of bus.

2. The method according to claim 1 wherein the iris scans for each student boarding and disembarking the bus are recorded on the mobile computing device, the mobile computing device being capable of recording and matching iris scan templates.

3. The method according to claim 1 further comprising tracking the entire route of the bus from the commencement of the bus run to the completion of the bus run via a GPS system, and transmitting the tracked route from the mobile computing device to a server.

4. The method according to claim 3 further comprising recording, on the mobile computing device, the identification of each student that boarded and disembarked the bus, and recording, on the mobile computing device, the tracked route of the bus from commencement of the bus run to the completion of the bus run, and transmitting the student identification and tracked route of the bus to the server.

5. The method according to claim 4 wherein the route for each bus is scheduled prior to commencement of the bus route by the school transportation administration, and the scheduled bus route is furnished to the bus driver.

6. The method according to claim 1 further comprising communicating, via text message, the date, time and location of the student's boarding of a school bus to the student's parent or guardian in real-time.

7. The method according to claim 1 further comprising communicating, via text message, the date, time and location of the student's disembarkation from a school bus to the student's parent or guardian in real-time.

8. The method according to claim 1 further comprising signaling, via the mobile computing device, to indicate when less students have disembarked from the school bus then have boarded the school bus to advise the bus driver to check for students left on the bus.

9. The method according to claim 8 further comprising if the driver does not scan the fixed identifier mounted at the rear of the bus within a set time, automatically alerting a transportation authority that the bus driver did not scan the fixed identifier mounted at the rear of the bus.

10. A method for tracking the location of a school bus, for identifying students on-board the school bus, and for identifying students that have disembarked from the school bus, the method comprising:

using a handheld, mobile computing device and iris scanner, biometrically scanning the iris of each student boarding the school bus to create and store an entry biometric image data of each student, the handheld, mobile computing device and iris scanner being fully portable independent of the school bus for allowing the irises of the students to be scanned anywhere within the school bus, and outside of the school bus;

comparing the entry biometric image data with enrolled biometric image data of students authorized to be transported on school buses in order to identify the student and thus confirm that the student is an authorized bus rider;

obtaining location data via GPS capabilities of the handheld, mobile computing device, the location data representing the location of the school bus, communicating the scanned biometric image data and the location data to a cloud database for subsequent retrieval, using the handheld, mobile computing device and iris scanner, biometrically scanning the iris of each student disembarking from the school bus to create an exit biometric image data of each of the students disembarking from the school bus, and comparing the exit biometric image data with the enrolled biometric image data of students authorized to be transported on school buses, wherein the handheld, mobile computing device is structured to automatically switch modes based upon GPS location data, the modes being defined as comprising a standby mode and a scanning mode, wherein the handheld, mobile computing device is structured to automatically enter standby mode at least partially between bus stops, and automatically enter scanning mode when the school bus approaches a scheduled bus stop.

11. The method according to claim 10 wherein, after a school evacuation wherein the school bus and students are taken to a safe location, communicating, via text message, the location of the students to the student's parent or guardian.

* * * * *